US009465098B2

(12) United States Patent
Ho

(10) Patent No.: US 9,465,098 B2
(45) Date of Patent: Oct. 11, 2016

(54) MITIGATING LOW DUTY FACTOR ELECTRONIC ATTACK (EA)

(71) Applicant: Michael T. Ho, Torrance, CA (US)

(72) Inventor: Michael T. Ho, Torrance, CA (US)

(73) Assignee: Raytheon Company, Waltham, MA (US)

(*) Notice: Subject to any disclaimer, the term of this patent is extended or adjusted under 35 U.S.C. 154(b) by 587 days.

(21) Appl. No.: 14/025,178

(22) Filed: Sep. 12, 2013

(65) Prior Publication Data
US 2016/0216364 A1 Jul. 28, 2016

(51) Int. Cl.
G01S 7/36 (2006.01)
G06F 17/16 (2006.01)

(52) U.S. Cl.
CPC ........ G01S 7/36 (2013.01); G06F 17/16 (2013.01)

(58) Field of Classification Search
CPC ........ G01S 7/36; G01S 7/495; G01S 7/2813; G01S 7/023; G06F 17/16; H04K 3/00; H04K 3/228; H04K 3/42; H04K 3/224; H01Q 3/2611
USPC ............................................. 342/16–19, 194
See application file for complete search history.

(56) References Cited

U.S. PATENT DOCUMENTS

| 4,642,643 | A | * | 2/1987 | Wise | H04K 3/22 342/13 |
| 4,876,545 | A | * | 10/1989 | Carlson | G01S 7/021 342/14 |
| 5,128,679 | A | * | 7/1992 | Moffat | G01S 7/36 342/13 |
| 5,276,450 | A | * | 1/1994 | Schwegman | G01S 7/36 342/16 |
| 6,486,823 | B1 | * | 11/2002 | Benson | G01S 7/38 342/14 |
| 2005/0179585 | A1 | * | 8/2005 | Walker | G01S 13/0209 342/134 |
| 2008/0111728 | A1 | * | 5/2008 | Stevens | G01S 7/38 342/14 |
| 2009/0091492 | A1 | | 4/2009 | Sanyal et al. | |
| 2013/0234878 | A1 | * | 9/2013 | Kemkemian | G01S 7/36 342/18 |

FOREIGN PATENT DOCUMENTS

EP 2048775 A1 4/2009

OTHER PUBLICATIONS

Shuangcai et al., "An Algorithm of Radar Deception Jamming Suppression Based on Blind Signal Separation", Computational Problem-Solving (ICCP), 2011 International Conference on, IEEE, Oct. 21, 2011, pp. 167-170.

(Continued)

Primary Examiner — John B Sotomayor
(74) Attorney, Agent, or Firm — Burns & Levinson LLP; Joseph M. Maraia

(57) ABSTRACT

A method for mitigating low duty factor electronic attack (EA) includes taking M samples of each of N pulses of radar return energy. The method includes forming an M×N pulse sample data matrix (PSDM) using the M samples and N pulses of the radar return energy including in-phase and quadrature phase components of the radar return energy and jamming data from the low duty factor EA. The method includes defining a 2N×1 vector for each row of the PSDM. The method includes computing a 4N×1 vector separating the in-phase and quadrature phase measurements of the jamming data from the low duty factor EA into a respective half of the 4N×1 vector using the 2N×1 vector and a measurement matrix dictionary. The method includes extracting the jamming data from the 4N×1 vector and forming a clean M×N PSDM that is free of the jamming data using the 4N×1 vector.

14 Claims, 3 Drawing Sheets

(56) References Cited

OTHER PUBLICATIONS

Gang et al., "Adaptive Cancellation of DRFM False Targets for LFM Radar", Systems Engineering and Electronics, vol. 33, No. 8, Aug. 1, 2011, pp. 1760-1764.

S. Chen et al., "Atomic Decomposition by Basis Pursuit", SIAM Review (2001),vol. 43. No. 1, pp. 129-159.

* cited by examiner

MITIGATING LOW DUTY FACTOR ELECTRONIC ATTACK (EA)

BACKGROUND

Typically, jamming or electronic attack (EA) is in the form of a high power transmission designed to impair a radar system's performance. Jamming may comprise a signal modulated with noise or other disruptive information. The object of typical jammers is to impair the performance of a radar system's receiving electronics and/or obscure the display. The source of jamming interference may be mobile or may be relatively stationary (e.g., land based systems).

An example of a jamming device is a Digital Radio Frequency Memory (DRFM) jammer that uses deception modes to cause radar systems to detect multiple false range targets. For instance, DRFM jammers emit jamming signals that are designed to mimic the radar return of multiple targets at different ranges. In an example, such DRFM jammers emit low duty factor EA waveforms in order to cause radar systems to detect multiple false range targets. Such EA waveforms are jamming transmissions that are on for less than 10 percent of a radar system's coherent integration time (CPI).

SUMMARY

Embodiments of the present disclosure include methods, systems, or non-transitory computer readable medium, with program codes embodied thereon, for mitigating low duty factor electronic attack (EA) in a radar system.

One embodiment is a method that includes receiving N pulses of radar return energy. The N pulses of radar return energy include jamming data from the low duty factor EA. The method also includes digitizing the received N pulses of radar return energy and taking M samples of each of the digitized N pulses of the radar return energy. In addition, the method includes forming an M×N pulse sample data matrix (PSDM) using the M samples and digitized N pulses of the radar return energy, wherein each cell of the PSDM includes an in-phase and quadrature phase measurement of the radar return energy and jamming data from the low duty factor EA. The method includes defining a 2N×1 vector for each row of the PSDM. The in-phase and quadrature phase measurements in each cell of the PSDM are separated into a respective half of the 2N×1 vector. Also, the method includes computing a 4N×1 vector, where the in-phase and quadrature phase measurements of the jamming data from the low duty factor EA are separated into a respective half of the 4N×1 vector using the 2N×1 vector and a measurement matrix dictionary. Further, the method includes extracting the jamming data from the 4N×1 vector and forming a clean M×N PSDM using the 4N×1 vector, where the clean PSDM is substantially free of the jamming data from the low duty factor EA.

The method can further include forming the measurement matrix dictionary, A, as a 2N×4N measurement matrix, wherein the 2N×4N measurement matrix dictionary is defined according to:

$$A_{m,n} = \begin{cases} \cos(2\pi mn/N) & \text{if } 0 \le n < N \text{ and } 0 \le m < N \\ -\sin(2\pi mn/N) & \text{if } N \le n < 2N \text{ and } 0 \le m < N \\ \sin(2\pi mn/N) & \text{if } 0 \le n < N \text{ and } N \le m < 2N \\ \cos(2\pi mn/N) & \text{if } N \le n < 2N \text{ and } N \le m < 2N \\ 1 & \text{if } n \ge 2N \text{ and } m = n \\ 0 & \text{else} \end{cases}$$

where A is the measurement matrix dictionary, m and n are indices in the measurement matrix dictionary A, and N is a number of pulses emitted by the radar system.

The 2N×1 vector can be defined according to:

$$y^{(m)} := [Re\ y_{m,1}, Re\ y_{m,2} \ldots, Re\ y_{m,n}, Im\ y_{m,1}, Im\ y_{m,2} \ldots, Im\ y_{m,n}]^T,$$

where $y^{(m)}$ is the 2N×1 vector corresponding to the $m^{th}$ row of the PSDM, Re is the in-phase measurement of the radar return energy, and Im is the quadrature phase measurement of the radar return energy, T denotes a transpose step.

The 4N×1 vector can be computed according to:

$$x^{(m)} = \operatorname{argmin} \|x\|_{l_1}$$
$$\text{s.t. } \|Ax - y^{(m)}\|_{l_2} \le \varepsilon,$$

where $x^{(m)}$ is 4N×1 vector corresponding to the $m^{th}$ row of the PSDM, A is the measurement matrix dictionary, $l_1$ and $l_2$ refer to $l_1$ and $l_2$ norms, $\varepsilon$ is a non-negative number based on a measurement model uncertainty and a thermal noise level, and $y^{(m)}$ is the 2N×1 vector corresponding to the $m^{th}$ row of the PSDM.

The variable $x^{(m)}$ can be chosen by minimizing:

$$\sum_{n=0}^{4N-1} |x_n^{(m)}|, \text{ and}$$

satisfying the inequality:

$$\sqrt{\sum_{l=0}^{2N-1} \left( \sum_{n=0}^{4N-1} A_{l,n} x_n^{(m)} - y_l^{(m)} \right)^2} \le \varepsilon,$$

where $x_n^{(m)}$ is the n-th element in the vector $X^{(m)}$ and $y_l^{(m)}$ is the l-th element in the vector $y^{(m)}$.

The method can include extracting the jamming data from the 4N×1 vector $x^{(m)}$ by defining the jamming data according to: $j_k^{(m)} = x_{k+2N}^{(m)} + \sqrt{-1} x_{k+3N}^{(m)}$ k=0, 1, 2, . . . , N−1, where $j_k^{(m)}$ is an N×1 vector of complex numbers representing the jamming data corresponding to the $m^{th}$ row of the PSDM.

The clean M×N PSDM can be defined according to: $z_{m,k} = y_k^{(m)} - j_k^{(m)}$, where $z_{m,k}$ is the clean M×N PSDM.

Another embodiment of the present disclosure is a system for mitigating low duty factor electronic attack (EA) in a radar system. The system includes one or more processors. The system also includes a radar receiver configured to receive N pulses of radar return energy. The N pulses of radar return energy includes jamming data from the low duty factor EA. Also, the system includes an analog-to-digital converter configured to digitize the received N pulses of radar return energy. Further, the system includes a memory that includes executable code representing instructions that when executed cause the system to: take M samples of each of the digitized N pulses of the radar return energy, form an M×N pulse sample data matrix (PSDM) using the M samples and digitized N pulses of the radar return energy, wherein each cell of the PSDM includes an in-phase and quadrature phase measurement of the radar return energy and jamming data from the low duty factor EA, define a 2N×1 vector for each row of the PSDM, the 2N×1 vector separating the in-phase and quadrature phase measurements in each cell of the PSDM into a respective half of the 2N×1 vector, compute a 4N×1 vector, the 4N×1 vector separating the in-phase and quadrature phase measurements of the jamming data from the low duty factor EA into a respective half of the 4N×1 vector using the 2N×1 vector and a measurement matrix dictionary, extract the jamming data from the 4N×1 vector, and form a clean M×N PSDM using the 4N×1 vector, the clean PSDM being substantially free of the jamming data from the low duty factor EA.

The memory can further include executable code representing instructions that when executed cause the system to form the measurement matrix dictionary, A, as a 2N×4N measurement matrix, wherein the 2N×4N measurement matrix dictionary is defined according to:

$$A_{m,n} = \begin{cases} \cos(2\pi mn/N) & \text{if } 0 \le n < N \text{ and } 0 \le m < N \\ -\sin(2\pi mn/N) & \text{if } N \le n < 2N \text{ and } 0 \le m < N \\ \sin(2\pi mn/N) & \text{if } 0 \le n < N \text{ and } N \le m < 2N \\ \cos(2\pi mn/N) & \text{if } N \le n < 2N \text{ and } N \le m < 2N \\ 1 & \text{if } n \ge 2N \text{ and } m = n \\ 0 & \text{else} \end{cases}$$

where A is the measurement matrix dictionary, m and n are indices in the measurement matrix dictionary A, and N is a number of pulses emitted by the radar system.

The 2N×1 vector can be defined according to:

$$y^{(m)} := [Re\ y_{m,1}, Re\ y_{m,2}, \ldots, Re\ y_{m,n}, Im\ y_{m,1}, Im\ y_{m,2}, \ldots, Im\ y_{m,n}]^T,$$

where $y^{(m)}$ is the 2N×1 vector corresponding to the $m^{th}$ row of the PSDM, Re is the in-phase measurement of the radar return energy, Im is the quadrature phase measurement of the radar return energy, and T denotes a transpose step.

The 4N×1 vector can be computed according to:

$$x^{(m)} = \arg\min_x \|x\|_{l_1}$$
$$\text{s.t. } \|Ax - y^{(m)}\|_{l_2} \le \varepsilon$$

where $x^{(m)}$ is 4N×1 vector corresponding to the $m^{th}$ row of the PSDM, A is the measurement matrix dictionary, $l_1$ and $l_2$ refer to $l_1$ and $l_2$ norms, $\varepsilon$ is a non-negative number based on a measurement model uncertainty and a thermal noise level, and $y^{(m)}$ is the 2N×1 vector corresponding to the $m^{th}$ row of the PSDM.

The variable $x^{(m)}$ can be chosen by minimizing:

$$\sum_{n=0}^{4N-1} |x_n^{(m)}|,$$

and satisfying the inequality:

$$\sqrt{\sum_{l=0}^{2N-1}\left(\sum_{n=0}^{4N-1} A_{l,n} x_n^{(m)} - y_l^{(m)}\right)^2} \le \varepsilon,$$

where $x_n^{(m)}$ is the n-th element in the vector $X^{(m)}$ and $y_l^{(m)}$ is the 1-th element in the vector $y^{(m)}$.

The system can include extracting the jamming data from the 4N×1 vector $x^{(m)}$ by defining the jamming data according to:

$$j_k^{(m)} = x_{k+2N}^{(m)} + \sqrt{-1} x_{k+3N}^{(m)}\ k=0,1,2,\ldots,N-1,$$

where $j_k^{(m)}$ is an N×1 vector of complex numbers representing the jamming data corresponding to the $m^{th}$ row of the PSDM.

The clean M×N PSDM can be defined according to: $z_{m,k} = y_k^{(m)} - j_k^{(m)}$, where $z_{m,k}$ is the clean M×N PSDM.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In general, radar systems are used to detect, track, range, and/or image a target by illuminating the target with radar energy (e.g., electromagnetic energy). In order to prevent radar systems from providing accurate information related to a target, electronic attack (EA) (e.g. jamming) devices can be used to interfere with the radar systems. Typically, such jamming devices transmit electromagnetic energy in the form of a high power transmissions designed to impair a radar system's performance. Jamming may comprise a signal modulated with noise or other disruptive information. The object of typical jammers is to impair the performance of a radar system's receiving electronics and/or obscure the display. The source of jamming interference may be mobile or may be relatively stationary (e.g., land based systems).

Current nave radar systems mitigate the effects of jamming or EA by removing received data samples that include jamming. However, such samples can also include valuable data that can facilitate the radar system's ability to accurately detect, track, range, and/or image the target. Embodiments of the present disclosure remove low-duty factor jamming signals from a set of received radar return energy rather than removing the data samples, in their entirety, that include both jamming data and valuable radar return data.

Many types of coherent DRFM jammers generate low duty factor EA waveforms. In the context of this disclosure a low duty factor electronic attack waveform is defined as a jamming transmission that is on for less than 10 percent of the radar's coherent integration time (CPI). Low duty factor EA waveforms are often used in deception jamming modes such as multiple false range targets.

Figure 1:
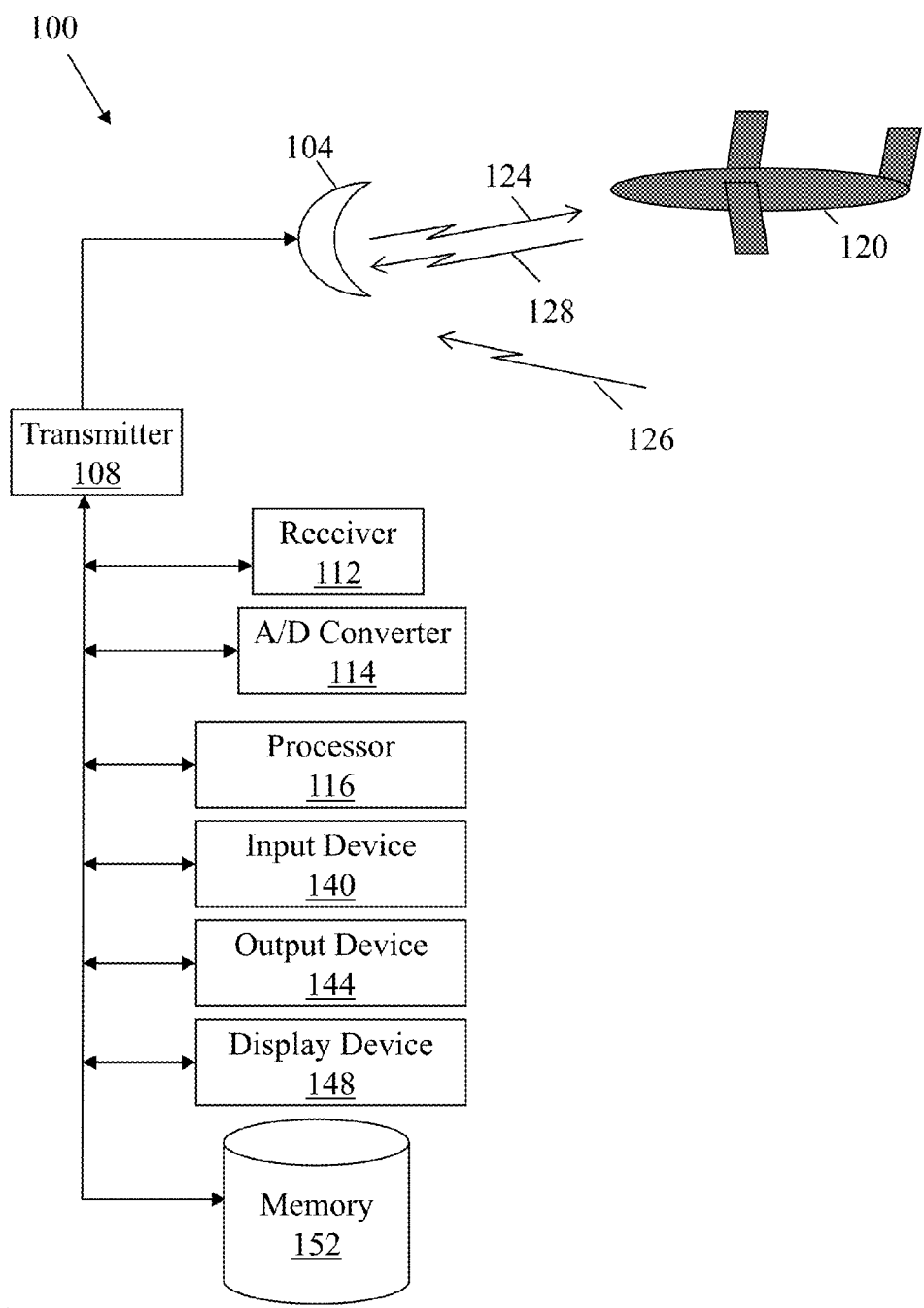
FIG. 1 is a schematic illustration of a radar system, according to an illustrative embodiment of the present disclosure.

FIG. 1 is a schematic illustration of a radar system 100. The system 100 includes a processor 116 electrically coupled to a radar signal transmitter 108 and a radar signal receiver 112. The processor 116 can be, for example, an aperture imaging processor or other suitable computer processor used in radar systems for controlling operation of a radar system. The transmitter 108 and receiver 112 are coupled to an antenna 104. The processor 116 provides transmission waveforms to the transmitter 108 which are transmitted by the antenna 104. The transmission waveforms 124 (e.g., radar transmission signals) are directed towards a target 120 (e.g., aircraft, satellite, vehicle, boat) to, for example, determine the range and velocity of the target relative to the antenna 104. Return radar waveforms 128 (e.g., radar return signals reflected back towards the antenna 104 in response to the transmission waveforms 124 impinging upon the target 120) are received by the antenna 104. The receiver 112 receives the response signals (i.e., return radar waveforms 128) from the antenna 104 and directs the signals to the processor 116 via an analog-to-digital (A/D) converter 114. In addition, the receiver 112 receives jamming signals (e.g., electronic attack (EA) 126 from a jamming source (not shown). In particular, the jamming signals 126 can be in the form of a low-duty factor electronic attack (EA) where the jammer is transmitting for less than 10 percent of the radar's coherent integration time. Low duty factor waveforms are often used by DRFM jammers in deception modes such as multiple false range targets.

The response signals 128 and the jamming signals 126 are passed through a low noise amplifier (LNA) (not shown) and then downconverted to reduce the radar return pulses to a baseband frequency. The downconverted radar return pulses are then provided to the A/D converter 114 to convert the pulses to a digital signal for subsequent processing by the processor 116.

The processor 116 is configured to process the various system 100 signals to mitigate low duty factor electronic attack (EA) in the radar system 100. The processor 116 uses a measurement matrix dictionary to identify the jamming signals 126 received by the radar system 100 with the radar return energy 128. The measurement matrix dictionary is defined according to:

$$A_{m,n} = \begin{cases} \cos(2\pi mn/N) & \text{if } 0 \le n < N \text{ and } 0 \le m < N \\ -\sin(2\pi mn/N) & \text{if } N \le n < 2N \text{ and } 0 \le m < N \\ \sin(2\pi mn/N) & \text{if } 0 \le n < N \text{ and } N \le m < 2N \\ \cos(2\pi mn/N) & \text{if } N \le n < 2N \text{ and } N \le m < 2N \\ 1 & \text{if } n \ge 2N \text{ and } m = n \\ 0 & \text{else} \end{cases}, \quad \text{EQN. 1}$$

where A is the measurement matrix dictionary, m and n are indices in the measurement matrix dictionary A, and N is a number of pulses of the radar transmission signals 124 emitted by the radar system 100. The radar system 100 then separates the jamming signals 126 from the received radar return energy 128. Once the radar system jamming signals 126 are from the radar return energy 128, the processor 116 processes digital data representative of only the radar return energy 128.

The modules and devices described herein can, for example, utilize the processor 116 to execute computer executable instructions and/or include another processor to execute computer executable instructions (e.g., an encryption processing unit, a field programmable gate array processing unit, etc.). It should be understood that the system 100 can include, for example, other modules, devices, and/or processors known in the art and/or varieties of the illustrated modules, devices, and/or processors.

The input device 140 receives information associated with the system 100 (e.g., instructions from a user, instructions from another computing device) from a user (not shown) and/or another computing system (not shown). The input device 140 can include, for example, a keyboard or a scanner. The output device 144 outputs information associated with the system 100 (e.g., information to a printer (not shown), information to an audio speaker (not shown)).

The display device 148 displays information associated with the system 100 (e.g., status information, configuration information). The processor 116 executes the operating system and/or any other computer executable instructions for the system 100 (e.g., sends signals to the transmitter 108 for transmission (transmission radar waveforms 124) by the antenna 104, or receives return radar waveforms 128 and jamming signals 126 from the antenna 104).

The memory 152 stores the various information associated with the system 100 and its operation. The memory 152 can store information and/or any other data associated with the system 100. The memory 152 can include a plurality of storage devices. The memory 152 can include, for example, long-term storage (e.g., a hard drive, a tape storage device, flash memory, etc.), short-term storage (e.g., a random access memory, a graphics memory, etc.), and/or any other type of computer readable storage.

Figure 2:
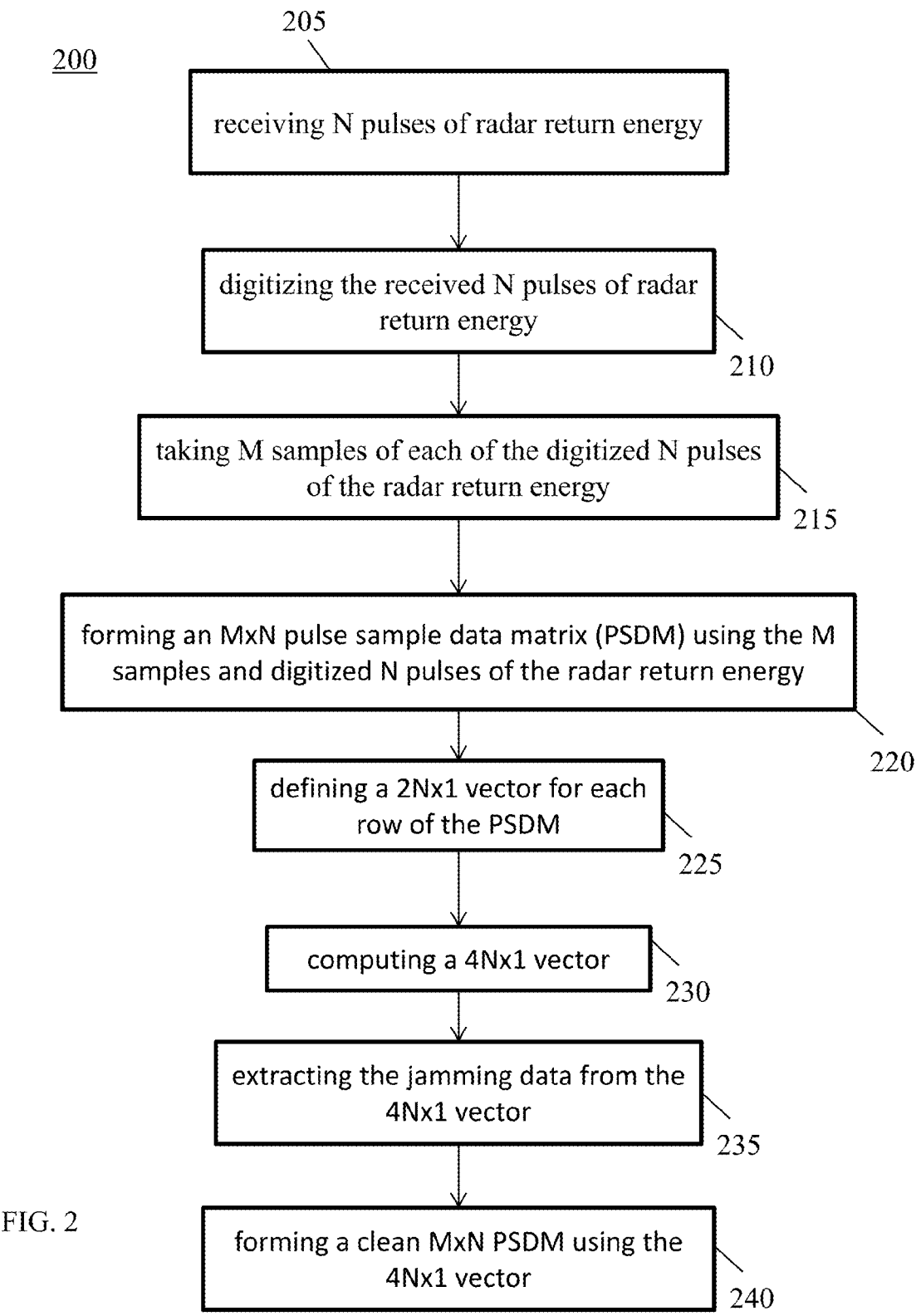
FIG. 2 is a flow diagram of a method for mitigating low duty factor electronic attack (EA) in a radar system, according to an illustrative embodiment of the present disclosure.

FIG. 2 is a flow diagram of a method 200 for mitigating low duty factor electronic attack (EA) in a radar system (e.g., radar system 100 of FIG. 1) in accordance with an example embodiment of the present disclosure. The method 200, at 205, includes receiving N pulses of radar return energy by, for example, a radar receiver (e.g., receiver 104 of FIG. 1). The N pulses of radar return energy are received by the radar system in response to emitted radar pulses impinging and reflecting off a surface of a target (e.g., aircraft 120 of FIG. 1). In this example, the N pulses of radar return energy include jamming signals from a low duty factor EA device where the jammer is transmitting for less than 10 percent of the radar's coherent integration time. This can occur when a DRFM jammer uses a deception mode such as multiple false range targets. In response to receiving the N pulses of radar energy and jamming data, the method 200, at 210, includes digitizing the received N pulses of radar return energy. For example, an A/D converter (e.g., A/D converter 114 of FIG. 1), digitizes the received signals.

The method 200, at 215, using, for example, a processor (e.g., processor 116 of FIG. 1), takes M samples of each of the digitized N pulses of the radar return energy. The method 200, at 220, forms an M×N pulse sample data matrix (PSDM) using the M samples and digitized N pulses of the radar return energy. Each cell of the PSDM includes an in-phase and quadrature phase measurement of the radar return energy and jamming data from the low duty factor EA.

Figure 3:
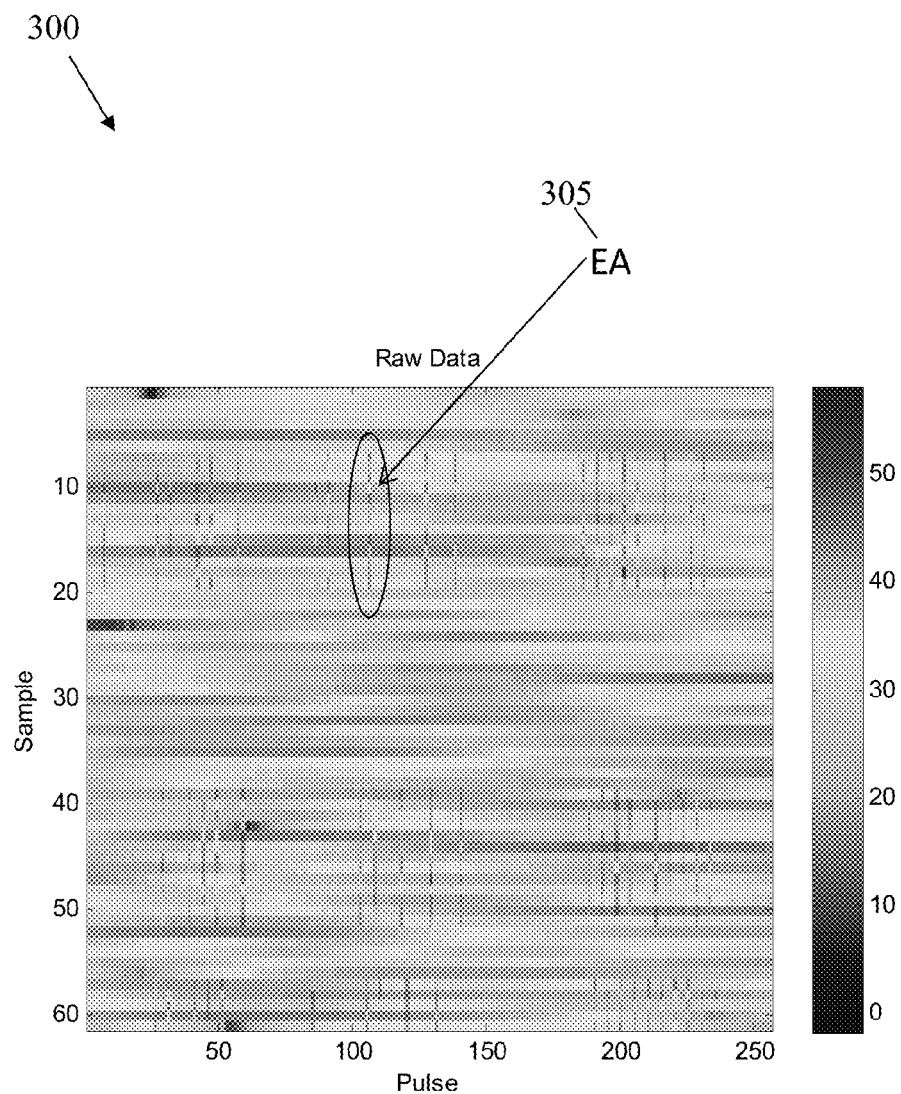
FIG. 3 is a schematic illustration of a Pulse Sample Data Matrix (PSDM) that includes jamming data, according to an illustrative embodiment of the present disclosure.

FIG. 3 is a schematic illustration of a Pulse Sample Data Matrix (PSDM) 300 that includes jamming data, according to an illustrative embodiment of the present disclosure. The PSDM 300 is logically organized with the M samples represented by the vertical axis of the PSDM 300 and the N pulses of the radar return energy on the horizontal axis of the PSDM 300. As stated herein, the radar system received radar return energy that includes jamming signals (e.g., low duty factor EA signals) 305.

Referring back to FIG. 2, the method 200, at 225, includes defining a 2N×1 vector for each row of the PSDM. The 2N×1 vector separates the in-phase and quadrature phase measurements in each cell of the PSDM 300 into a respective half of the 2N×1 vector. The 2N×1 vector is defined according to:

$$y^{(m)} := [Re\ y_{m,1}, Re\ y_{m,2}\ldots, Re\ y_{m,n}, Im\ y_{m,1}, Im\ y_{m,2}\ldots, Im\ y_{m,n}]^T, \quad \text{EQN. 2}$$

where $y^{(m)}$ is the 2N×1 vector corresponding to the $m^{th}$ row of the PSDM 300, Re is the in-phase measurement of the radar return energy, and Im is the quadrature phase measurement of the radar return energy, and T denotes a transpose step.

At 230, the method 200 includes computing a 4N×1 vector that separates the in-phase and quadrature phase measurements of the jamming data from the low duty factor EA into a respective half of the 4N×1 vector using the 2N×1 vector and a measurement matrix dictionary.

In an example embodiment, the method 200 can include forming the measurement matrix dictionary, A, as a 2N×4N measurement matrix, wherein the 2N×4N measurement matrix dictionary is defined according to EQN. 1.

The method 200 includes computing the 4N×1 vector according to:

$$x^{(m)} = \arg\min_{x} \|x\|_{l_1} \quad \text{EQN. 3}$$
$$\text{s.t.} \quad \|Ax - y^{(m)}\|_{l_2} \leq \varepsilon,$$

where $x^{(m)}$ is 4N×1 vector corresponding to the $m^{th}$ row of the PSDM, A is the measurement matrix dictionary, $l_1$ and $l_2$ refer to $l_1$ and $l_2$ norms, $\varepsilon$ is a non-negative number based on a measurement model uncertainty and a thermal noise level, and $y^{(m)}$ is the 2N×1 vector corresponding to the $m^{th}$ row of the PSDM 300. The variable $x^{(m)}$ can be chosen by minimizing $$\sum_{n=0}^{4N-1} |x_n^{(m)}|, \text{ and} \quad \text{EQN. 4}$$

satisfying the inequality:

$$\sqrt{\sum_{l=0}^{2N-1}\left(\sum_{n=0}^{4N-1} A_{l,n} x_n^{(m)} - y_l^{(m)}\right)^2} \leq \varepsilon, \quad \text{EQN. 5}$$

where $x_n^{(m)}$ is the n-th element in the vector $X^{(m)}$ and $y_1^{(m)}$ is the l-th element in the vector $y^{(m)}$.

The method 200, at 235, also includes extracting the jamming data from the 4N×1 vector. For example, extracting the jamming data from the 4N×1 vector $x^{(m)}$ can include defining the jamming data according to:

$$j_k^{(m)} = x_{k+2N}^{(m)} + \sqrt{-1} x_{k+3N}^{(m)}\ k=0,1,2,\ldots,N-1, \quad \text{EQN. 6}$$

where $j_k^{(m)}$ is an N×1 vector of complex numbers representing the jamming data corresponding to the $m^{th}$ row of the PSDM.

Subsequently, at 240, the method 200 includes forming a clean M×N PSDM using the 4N×1 vector. The clean PSDM is substantially free of the jamming data from the low duty factor EA. For example the clean PSDM can be defined according to $$z_{m,k} = y_k^{(m)} - j_k^{(m)}, \quad \text{EQN. 7}$$

where $z_{m,k}$ is the clean M×N PSDM. Using the clean M×N PSDM, the radar system is able to, for example, detect, track, range, and/or image a target without the interference of the low duty factor jamming signals.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the disclosure by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

Further example embodiments of the present disclosure may be configured using a computer program product; for example, controls may be programmed in software for implementing example embodiments of the present disclosure. Further example embodiments of the present disclosure may include a non-transitory computer readable medium containing instruction that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the disclosure.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the present disclosure may be embodied in other specific forms without departing from the spirit or essential characteristics thereof. The foregoing embodiments are therefore to be considered in all respects illustrative rather than limiting of the disclosure described herein. The scope of the presented disclosure is thus indicated by the appended claims, rather than by the foregoing description, and all changes that come within the meaning and range of equivalency of the claims are therefore intended to be embraced therein.

What is claimed is:

1. A method for mitigating low duty factor electronic attack (EA) in a radar system, the method comprising:

receiving N pulses of radar return energy, the N pulses of radar return energy including jamming data from the low duty factor EA;

digitizing the received N pulses of radar return energy;

taking M samples of each of the digitized N pulses of the radar return energy;

forming an M×N pulse sample data matrix (PSDM) using the M samples and digitized N pulses of the radar return energy, wherein each cell of the PSDM includes an in-phase and quadrature phase measurement of the radar return energy and jamming data from the low duty factor EA;

defining a 2N×1 vector for each row of the PSDM, the 2N×1 vector separating the in-phase and quadrature phase measurements in each cell of the PSDM into a respective half of the 2N×1 vector;

computing a 4N×1 vector, the 4N×1 vector separating the in-phase and quadrature phase measurements of the jamming data from the low duty factor EA into a respective half of the 4N×1 vector using the 2N×1 vector and a measurement matrix dictionary;

extracting the jamming data from the 4N×1 vector; and forming a clean M×N PSDM using the 4N×1 vector, the clean PSDM being substantially free of the jamming data from the low duty factor EA.

2. The method of claim 1 further comprising forming the measurement matrix dictionary, A, as a 2N×4N measurement matrix, wherein the 2N×4N measurement matrix dictionary is defined according to:

$$A_{m,n} = \begin{cases} \cos(2\pi mn/N) & \text{if } 0 \le n < N \text{ and } 0 \le m < N \\ -\sin(2\pi mn/N) & \text{if } N \le n < 2N \text{ and } 0 \le m < N \\ \sin(2\pi mn/N) & \text{if } 0 \le n < N \text{ and } N \le m < 2N \\ \cos(2\pi mn/N) & \text{if } N \le n < 2N \text{ and } N \le m < 2N \\ 1 & \text{if } n \ge 2N \text{ and } m = n \\ 0 & \text{else} \end{cases},$$

where A is the measurement matrix dictionary, m and n are indices in the measurement matrix dictionary A, and N is a number of pulses emitted by the radar system.

3. The method of claim 2, wherein the 2N×1 vector is defined according to:

$$y^{(m)} := [Re\ y_{m,1}, Re\ y_{m,2}, \ldots, Re\ y_{m,n}, Im\ y_{m,1}, Im\ y_{m,2}, \ldots, Im\ y_{m,n}]^T,$$

where $y^{(m)}$ is the 2N×1 vector corresponding to the $m^{th}$ row of the PSDM, Re is the in-phase measurement of the radar return energy, and Im is the quadrature phase measurement of the radar return energy, T denotes a transpose step.

4. The method of claim 3 wherein the 4N×1 vector is computed according to:

$$x^{(m)} = \arg\min_x \|x\|_{l_1}$$
$$\text{s.t. } \|Ax - y^{(m)}\|_{l_2} \le \varepsilon,$$

where $x^{(m)}$ is 4N×1 vector corresponding to the $m^{th}$ row of the PSDM, A is the measurement matrix dictionary, $l_1$ and $l_2$ refer to $l_1$ and $l_2$ norms, $\varepsilon$ is a non-negative number based on a measurement model uncertainty and a thermal noise level, and $y^{(m)}$ is the 2N×1 vector corresponding to the $m^{th}$ row of the PSDM.

5. The method of claim 4 wherein $x^{(m)}$ is chosen by minimizing:

$$\sum_{n=0}^{4N-1} |x_n^{(m)}|,$$

and
satisfying the inequality:

$$\sqrt{\sum_{l=0}^{2N-1} \left( \sum_{n=0}^{4N-1} A_{l,n} x_n^{(m)} - y_l^{(m)} \right)^2} \le \varepsilon,$$

where $x_n^{(m)}$ is the n-th element in the vector $X^{(m)}$ and $y_l^{(m)}$ is the l-th element in the vector $y^{(m)}$.

6. The method of claim 5 wherein extracting the jamming data from the 4N×1 vector $x^{(m)}$ includes defining the jamming data according to:

$$j_k^{(m)} = x_{k+2N}^{(m)} + \sqrt{-1} x_{k+3N}^{(m)}\ k=0,1,2,\ldots,N-1,$$

where $j_k^{(m)}$ is an N×1 vector of complex numbers representing the jamming data corresponding to the $m^{th}$ row of the PSDM.

7. The method of claim 6 wherein the clean M×N PSDM is defined according to:

$$z_{m,k} = y_k^{(m)} - j_k^{(m)},$$

where $z_{m,k}$ is the clean M×N PSDM.

8. A system for mitigating low duty factor electronic attack (EA) in a radar system, the system comprising:
one or more processors;
a radar receiver configured to receive N pulses of radar return energy, the N pulses of radar return energy including jamming data from the low duty factor EA;
an analog-to-digital converter configured to digitize the received N pulses of radar return energy; and
a memory, the memory including executable code representing instructions that when executed cause the system to:
take M samples of each of the digitized N pulses of the radar return energy,
form an M×N pulse sample data matrix (PSDM) using the M samples and digitized N pulses of the radar return energy, wherein each cell of the PSDM includes an in-phase and quadrature phase measurement of the radar return energy and jamming data from the low duty factor EA,
define a 2N×1 vector for each row of the PSDM, the 2N×1 vector separating the in-phase and quadrature phase measurements in each cell of the PSDM into a respective half of the 2N×1 vector,
compute a 4N×1 vector, the 4N×1 vector separating the in-phase and quadrature phase measurements of the jamming data from the low duty factor EA into a respective half of the 4N×1 vector using the 2N×1 vector and a measurement matrix dictionary,
extract the jamming data from the 4N×1 vector, and
form a clean M×N PSDM using the 4N×1 vector, the clean PSDM being substantially free of the jamming data from the low duty factor EA.

9. The system of claim 8 wherein the memory further includes executable code representing instructions that when executed cause the system to form the measurement matrix dictionary, A, as a 2N×4N measurement matrix, wherein the 2N×4N measurement matrix dictionary is defined according to:

$$A_{m,n} = \begin{cases} \cos(2\pi mn/N) & \text{if } 0 \le n < N \text{ and } 0 \le m < N \\ -\sin(2\pi mn/N) & \text{if } N \le n < 2N \text{ and } 0 \le m < N \\ \sin(2\pi mn/N) & \text{if } 0 \le n < N \text{ and } N \le m < 2N \\ \cos(2\pi mn/N) & \text{if } N \le n < 2N \text{ and } N \le m < 2N \\ 1 & \text{if } n \ge 2N \text{ and } m = n \\ 0 & \text{else} \end{cases},$$

where A is the measurement matrix dictionary, m and n are indices in the measurement matrix dictionary A, and N is a number of pulses emitted by the radar system.

10. The system of claim 9, wherein the 2N×1 vector is defined according to:

$$y^{(m)} := [Re\ y_{m,1}, Re\ y_{m,2}, \ldots, Re\ y_{m,n}, Im\ y_{m,1}, Im\ y_{m,2}, \ldots, Im\ y_{m,n}]^T,$$

where $y^{(m)}$ is the 2N×1 vector corresponding to the $m^{th}$ row of the PSDM, Re is the in-phase measurement of the radar return energy, and Im is the quadrature phase measurement of the radar return energy, T denotes a transpose step.

11. The system of claim 10 wherein the 4N×1 vector is computed according to:

$$x^{(m)} = \arg\min_x \|x\|_{l_1}$$
$$\text{s.t.} \quad \|Ax - y^{(m)}\|_{l_2} \leq \varepsilon$$

where $x^{(m)}$ is 4N×1 vector corresponding to the $m^{th}$ row of the PSDM, A is the measurement matrix dictionary, $l_1$ and $l_2$ refer to $l_1$ and $l_2$ norms, $\epsilon$ is a non-negative number based on a measurement model uncertainty and a thermal noise level, and $y^{(m)}$ is the 2N×1 vector corresponding to the $m^{th}$ row of the PSDM.

12. The system of claim 11 wherein $x^{(m)}$ is chosen by minimizing:

$$\sum_{n=0}^{4N-1} |x_n^{(m)}|,$$

and
satisfying the inequality:

$$\sqrt{\sum_{l=0}^{2N-1}\left(\sum_{n=0}^{4N-1} A_{l,n} x_n^{(m)} - y_l^{(m)}\right)^2} \leq \varepsilon,$$

where $x_n^{(m)}$ is the n-th element in the vector $X^{(m)}$ and $y_1^{(m)}$ is the 1-th element in the vector $y^{(m)}$.

13. The system of claim 12 wherein extracting the jamming data from the 4N×1 vector $x^{(m)}$ includes defining the jamming data according to:

$$j_k^{(m)} = x_{k+2N}^{(m)} + \sqrt{-1} x_{k+3N}^{(m)} \quad k=0,1,2,\ldots,N-1,$$

where $j_k^{(m)}$ is an N×1 vector of complex numbers representing the jamming data corresponding to the $m^{th}$ row of the PSDM.

14. The system of claim 13 wherein the clean M×N PSDM is defined according to:

$$z_{m,k} = y_k^{(m)} - j_k^{(m)},$$

where $z_{m,k}$ is the clean M×N PSDM.

* * * * *